(12) United States Patent
Cheng et al.

(10) Patent No.: US 10,567,218 B2
(45) Date of Patent: Feb. 18, 2020

(54) SYSTEMS AND METHODS FOR ENABLING FRONTSIDE STACKING OF SWITCHES

(71) Applicant: Cisco Technology, Inc., San Jose, CA (US)

(72) Inventors: Linda T. Cheng, San Jose, CA (US); Manpreet Singh Sandhu, San Jose, CA (US); Subrat Mohanty, Los Gatos, CA (US); Ali Ahmad Tareen, Milpitas, CA (US); Ganesh Srinivasa Bhat, Union City, CA (US); Jimit Maheta, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 261 days.

(21) Appl. No.: 15/637,146

(22) Filed: Jun. 29, 2017

(65) Prior Publication Data

US 2019/0007262 A1 Jan. 3, 2019

(51) Int. Cl.
| | | |
|---|---|---|
| *H04L 12/24* | (2006.01) | |
| *H04L 12/933* | (2013.01) | |
| *H04L 12/823* | (2013.01) | |
| *H04L 12/947* | (2013.01) | |

(52) U.S. Cl.
CPC ......... *H04L 41/0803* (2013.01); *H04L 41/12* (2013.01); *H04L 47/32* (2013.01); *H04L 49/15* (2013.01); *H04L 49/25* (2013.01)

(58) Field of Classification Search
CPC ......... H04L 12/12; H04L 12/28; H04L 12/56; H04L 41/0813; H04L 49/15; G06F 9/45505; G06F 9/54; G06F 15/16; G06F 21/00; G01R 31/08
See application file for complete search history.

(56) References Cited

U.S. PATENT DOCUMENTS

| 6,785,272 B1 * | 8/2004 | Sugihara |
| 2002/0046271 A1 * | 4/2002 | Huang |
| 2005/0213582 A1 * | 9/2005 | Wakumoto et al. |
| 2007/0081463 A1 * | 4/2007 | Bohra et al. |

OTHER PUBLICATIONS

U.S. Appl. No. 15/636,933, filed Jun. 29, 2017, title: "Method and Apparatus to Optimize Multi-Destination Traffic Over Etherchannel in Stackwise Virtual Topology".
U.S. Appl. No. 15/637,034, filed Jun. 29, 2017, title: "Mechanism for Dual Active Detection Link Monitoring in Virtual Switching System with Hardware Accelerated Fast Hello".

* cited by examiner

*Primary Examiner* — Marsha D Banks Harold
*Assistant Examiner* — Dharmesh J Patel
(74) *Attorney, Agent, or Firm* — Merchant & Gould P.C.

(57) ABSTRACT

Methods and systems for configuring a first switch for frontside networking. The method includes: discovering the capabilities of a second switch connected to the first switch, where the capabilities include frontside stacking; changing a port on the first switch connected to the second switch from a standard port to a frontside stacking port; discovering a topology of a network containing the first switch and the second switch; and creating a drop table having entries for at least the first switch and the second switch.

19 Claims, 6 Drawing Sheets

Drop Table

| Originating Switch | Current Switch / Destination Port | | | | | | | | | |
|---|---|---|---|---|---|---|---|---|---|---|
| | SW1/A | SW1/B | SW2/A | SW2/B | SW2/C | SW3/A | SW3/B | SW4/A | SW4/B | SW4/C |
| SW1 | Drop | Forward | Drop | Forward | Drop | Drop | Forward | Drop | Drop | Drop |
| SW2 | Drop | Drop | Forward | Forward | Drop | Drop | Forward | Drop | Drop | Drop |
| SW3 | Drop | Drop | Forward | Drop | Drop | Forward | Forward | Drop | Drop | Drop |
| SW4 | Drop | Drop | Forward | Drop | Drop | Forward | Drop | Forward | Drop | Drop |

FIG. 2

SYSTEMS AND METHODS FOR ENABLING FRONTSIDE STACKING OF SWITCHES

TECHNICAL FIELD

This disclosure relates in general to configuring networks of switches and, more particularly, to configuring and enabling switches configured in arbitrary topologies.

BACKGROUND

Switches comprise backside ports and frontside ports. Backside ports are used to, for example, connect one switch to another switch to form a stacked switch. Backside ports typically have a maximum link distance of five meters or less, but communicate at a very high speed to allow multiple switches to communicate and act as a single larger switch. Frontside ports are ports used to typically attach devices to the switch. The advantage of frontside Ethernet ports is that they can connect devices over long distances, but at a speed slower than the connection speeds of backside ports.

In the past, switches that were spaced far apart could be connected together in a ring using two of the frontside ports. As only two frontside ports were available for frontside stacking, ring topologies have been the only topologies available, making mesh and other interesting configurations impossible. In addition, prior switches could not support ports in an etherchannel that were distributed across the frontside stack because once a packet went across a frontside stack, the port identifier of the originating device was lost. Also, the prior architecture provided a filtering mechanism to drop frames going out a frontside stack port depending on its source, but this applied to all packets and no provisions were made for control packets which are meant for switch to switch communication.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIG. 2 illustrates an exemplary drop table for the topology illustrated in FIG. 1 consistent with embodiments of the present disclosure.

DESCRIPTION OF EXAMPLE EMBODIMENTS

Overview

Figure 1:
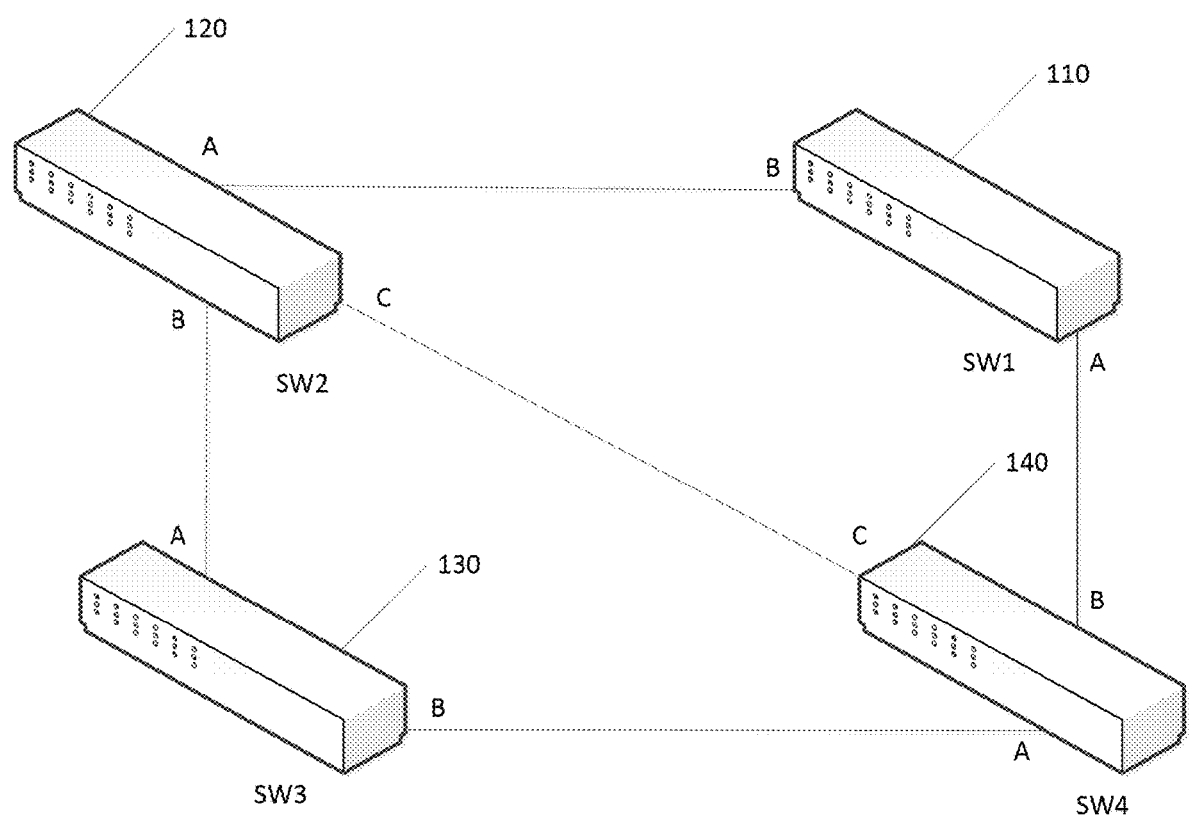
FIG. 1 illustrates an exemplary switch topology consistent with embodiments of the present disclosure.

Methods and systems for configuring a first switch for frontside networking are provided. The method includes: discovering the capabilities of a second switch connected to the first switch, where the capabilities include frontside stacking; changing a port on the first switch connected to the second switch from a standard port to a frontside stacking port; discovering a topology of a network containing the first switch and the second switch; and creating a drop table having entries for at least the first switch and the second switch.

Additional embodiments include a system of switches arranged in a mesh topology. The system includes: a first switch, a second switch, a third switch, and a fourth switch, wherein the first switch is connected to the second switch and the fourth switch, the second switch is further connected to the fourth switch and the third switch, and the third switch is further connected to the fourth switch, further wherein each connection is made using ports configured as frontside stacking ports; and a drop table configured to provide information about the relationship between each port on each switch and each other switch.

Also disclosed is a method of forwarding a packet from a first switch to a second switch. The method includes: performing a drop table check on the packet; performing a déjàvu check on the packet; performing a source node check on the packet; and when the packet passes each of the checks, forwarding the packet from the first switch to the second switch.

Further disclosures include a method for managing a frontside stacking port. The method includes: placing the frontside stacking port in a disconnected state upon startup; when a link up notification is received, placing the frontside stacking port in a pending state; and when eligibility criteria are met; transitioning the front side stacking port from the pending state to a ready state.

Example Embodiments

Frontside stacking in embodiments of the present disclosure differ from prior systems in several ways. In prior systems, the expected topology was a ring or simply two devices connected point to point. Given the fact that a maximum of two ports per switch, or node, could be configured for frontside stacking on prior systems, the most complicated topology could be a ring. In embodiments consistent with the present disclosure, topologies such as a mesh topology, or truly any topology, may be supported. In order to support this feature a frontside stacking drop table, or simply drop table, may be implemented that performs spanning tree type functions for loop breaking.

In addition, embodiments disclosed also support simultaneous backside and frontside stacking, so that load balancing is supported across group members spread across the backside and frontside stack. When a packet enters a node the following checks may be performed: a drop table check, a déjàvu check, and a source node check. Should a packet fail any of these checks, it may be dropped and not forwarded on to the next node; however, an exception is made for control packets, such as BPDU ("protocol data unit") packets which are used for node-to-node or switch-to-switch communication.

Also provides is a state diagram illustrating how frontside stack ports are made ready and put into different states, such as, disconnected, pending, error, timeout, and ready.

Figure 1A:
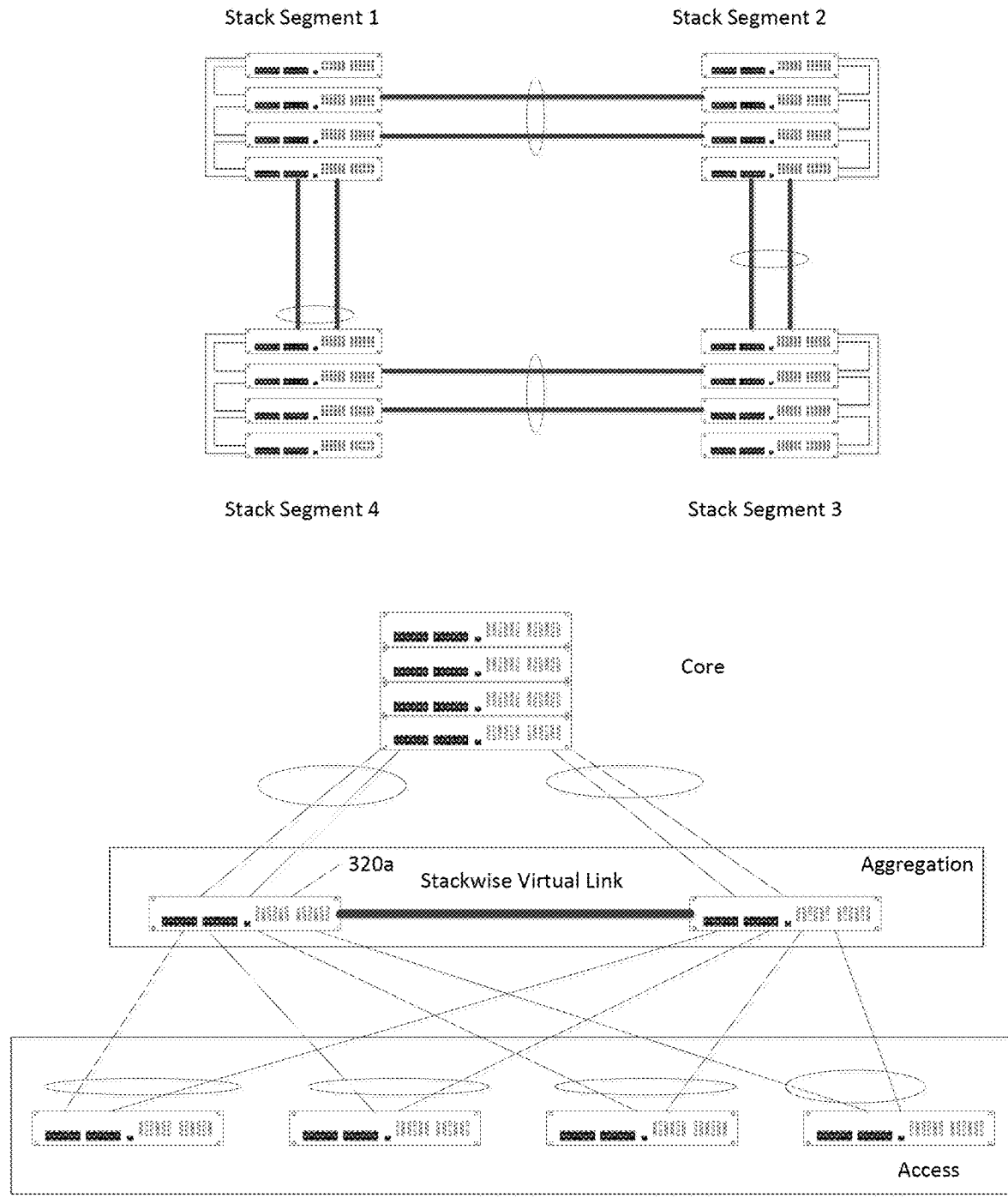
FIG. 1a illustrates other exemplary topologies consistent with embodiments of the present disclosure.

FIG. 1 illustrates an exemplary switch topology consistent with embodiments of the present disclosure. The exemplary topology is but one topology that is possible; the present disclosure allows for any arbitrary topology, a subset of which is illustrated in FIG. 1a. Four nodes are illustrated by the four switches, SW1 110, SW2 120, SW3 130, and SW4

140, where each node comprises a single switch. While only a single switch is illustrated, each node in the figure may also comprise a plurality of switches connected via backside stacking. Regardless, the process to be described may be the same. Also, while a particularly topology is illustrated in FIG. 1, this is not the sole topology to which the disclosure is directed. Any topology, including mesh topologies, may be implemented consistent with the concepts embodied in this disclosure.

Each of the switches has a plurality of frontside stacking ports. Switches, SW2 120 and SW4 140 have been configured with three of the frontside ports, A, B, and C, being used as frontside stacking ports. Switches SW1 110 and SW3 130 have been configured with two of the frontside ports, A and B, being used as frontside stacking ports. While the switches illustrated have three and two ports configured as frontside stacking ports, the present disclosure contemplates no particular limit on the number of frontside ports that may be configured as frontside stacking ports. In particularly complex mesh networks, a plurality of ports may be configured as frontside stacking ports.

In FIG. 1, SW1 110 has port A connected to port B of SW4 140. SW1 110 also has port B connected to port A of SW2 120. SW2 120 has port B connected to SW3 130 port A, and SW2 120 has port C connected to SW4 140 port C. Finally SW3 130 has port B connected to SW4 140 port A. Again, this is an exemplary configuration and other more complex configurations with more nodes are possible. Through the use of frontside stacking, the switches SW1, SW2, SW3, and SW4 can be located longer distances from each other (with distance only limited by the distance of Ethernet communication) than they could be if backside stacking was solely used.

FIG. 2 illustrates an exemplary drop table for the topology illustrated in FIG. 1 consistent with embodiments of the present disclosure. A drop table is used to enable the complex topologies contemplated by the present disclosure. The drop table may serve to break loops that may otherwise form as packets circulate within the frontside stacking topology. Absent a drop tables, these loops may keep packets needlessly circulating within the nodes of the topology. The drop table may be created manually or may be automated through the use of software, similar to a spanning tree network that uses a discovery protocol to examine the topology of the network and populate the drop table as required. The drop table spanning tree-like function populates the drop table to block paths as required, and possible, to determine the shortest physical or logical path between two nodes.

Drop table 200 in FIG. 2 is the drop table for the topology illustrated in FIG. 1. Other configurations would have different drop tables as determined manually or by a spanning tree-like function. Drop table 200 has a column on the left 210 that lists the originating switch of a packet; the second through eleventh columns 220 are for the current switch examining the packet and the appropriate port on the switch that is under examination. The way to read the table is that the action to drop or forward is determined at the destination port. Each destination port has an entry for every source node id (that represents the source switch or cluster of switches connected via a backside stack). Using the source node id a directive is retrieved to forward or drop the frame. For example, when transmitting out of SW1 110 port A ("SW1/A") if the source node is SW4 then the frame is marked for being dropped. In fact, as illustrated in drop table 200, SW1/A would not ever forward packets according to this drop table.

Software could flood all traffic to all stack ports and rely on the drop table to do the pruning. However, in practice, known unicast traffic would not be flooded, but multicast and span traffic could be flooded to reduce software complexity. So, in practice, flooding traffic is often kept to a minimum.

Figure 3:
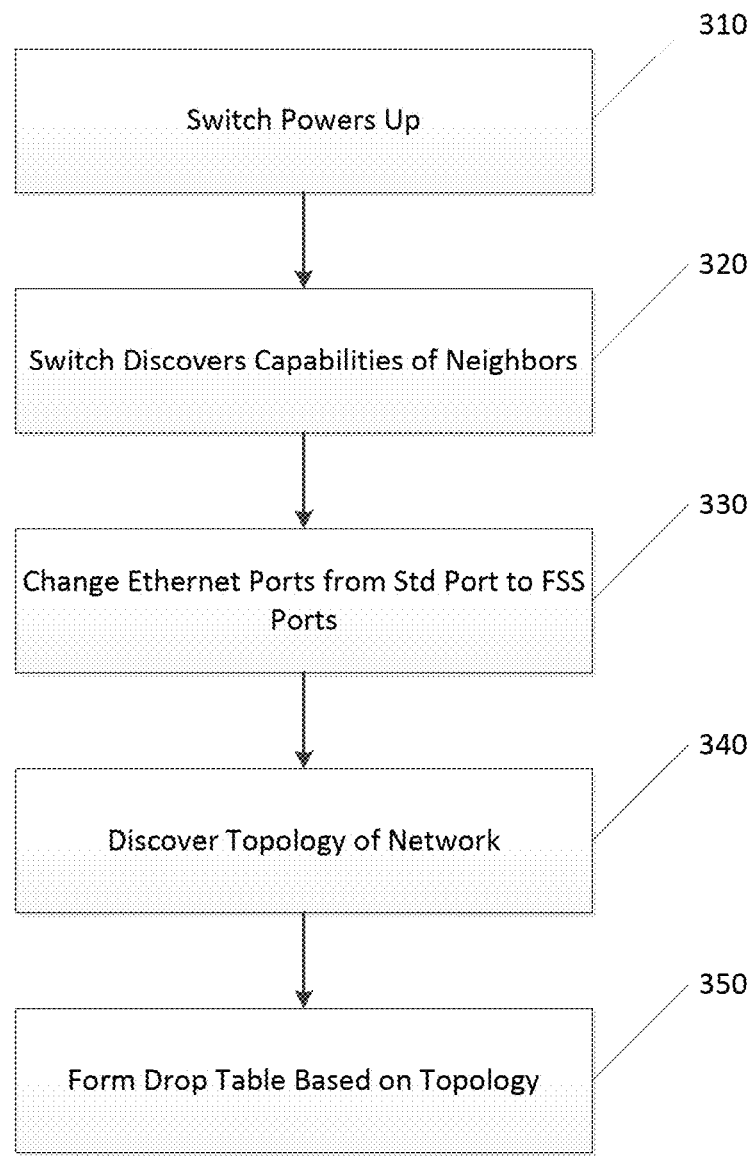
FIG. 3 is a flow chart of the startup sequence of a switch in a topology consistent with embodiments of the present disclosure.

FIG. 3 is a flow chart of the startup sequence of a switch in a topology consistent with embodiments of the present disclosure. Upon power up (stage 310), the switch will discover the capability of its neighbors (stage 320). Capabilities may be discovered by, for example, running a discovery protocol using BPDU. Once capabilities are discovered, each frontside port that is used for frontside stacking is setup as a frontside stacking port (stage 330). Next, the topology of the network is discovered by using a spanning tree-like protocol (stage 340). Once the topology of the network is known, the drop table may be manually or automatically populated using a spanning tree-like protocol (stage 350).

Figure 4:
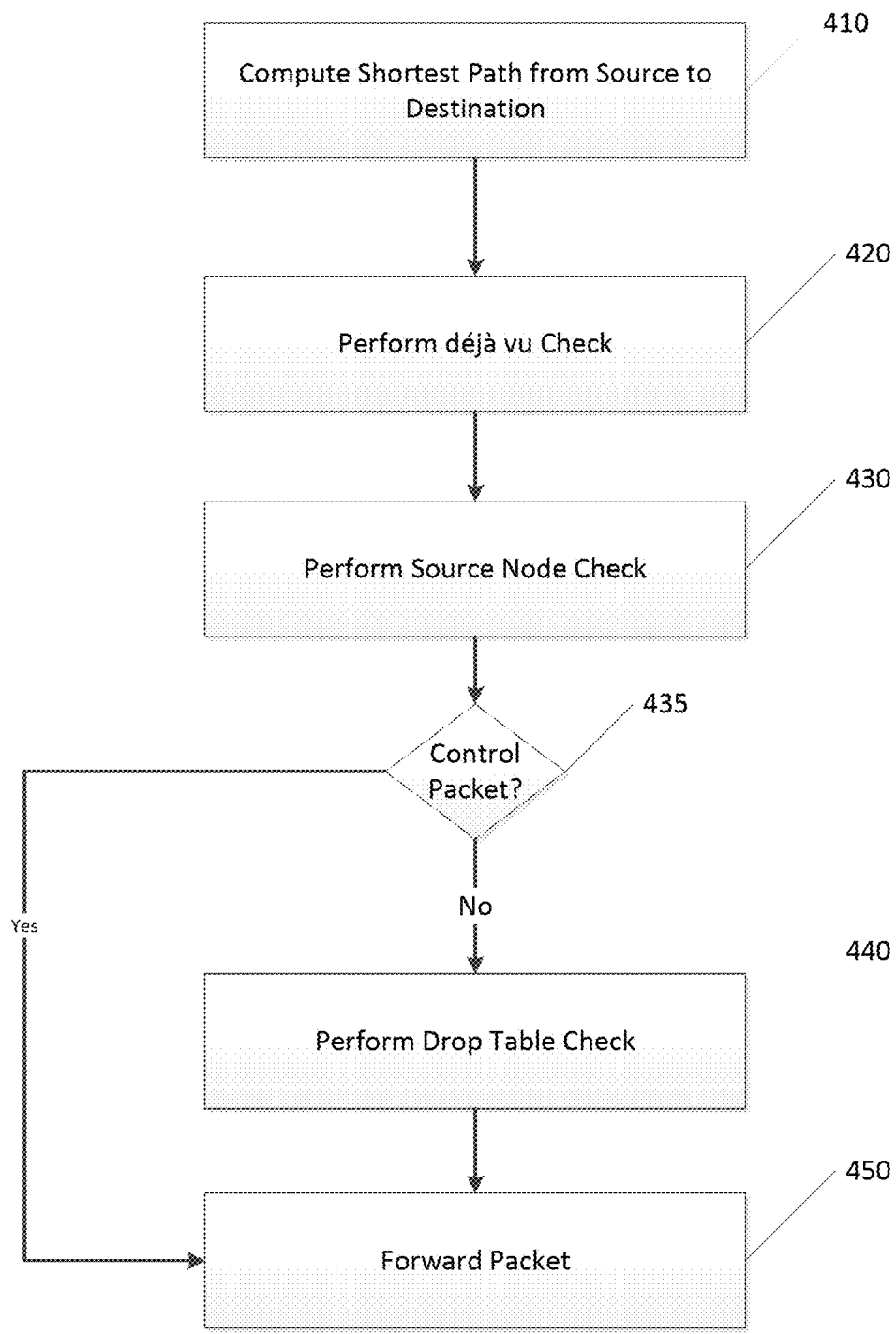
FIG. 4 is a flow chart of the packet checking methodology consistent with embodiments of the present disclosure.

FIG. 4 is a flow chart of the packet checking methodology consistent with embodiments of the present disclosure. As packets arrive at a frontside stacking port on a node, the shortest path, logically or physically, is looked up or determined (stage 410). Next, a déjàvu check is performed to determine if the packet has previously been forward by this node and if it has the packet is dropped (stage 420). Finally a source node check may be performed to determine if the packet was sourced from this same node (stage 430). A source node check need not be performed, because the drop table may prevent a packet from returning to its source, but may be performed as an extra precaution. A check is made to determine if the packet is a control packet, such as a BPDU, (stage 435) and if so the packet is forwarded on without any further checks at stage 450. If the packet is not a control packet, the drop table is consulted to determine if the packet is to be forwarded or to be dropped (stage 440). At stage 450, any packets that survive these checks are forwarded on.

Figure 5:
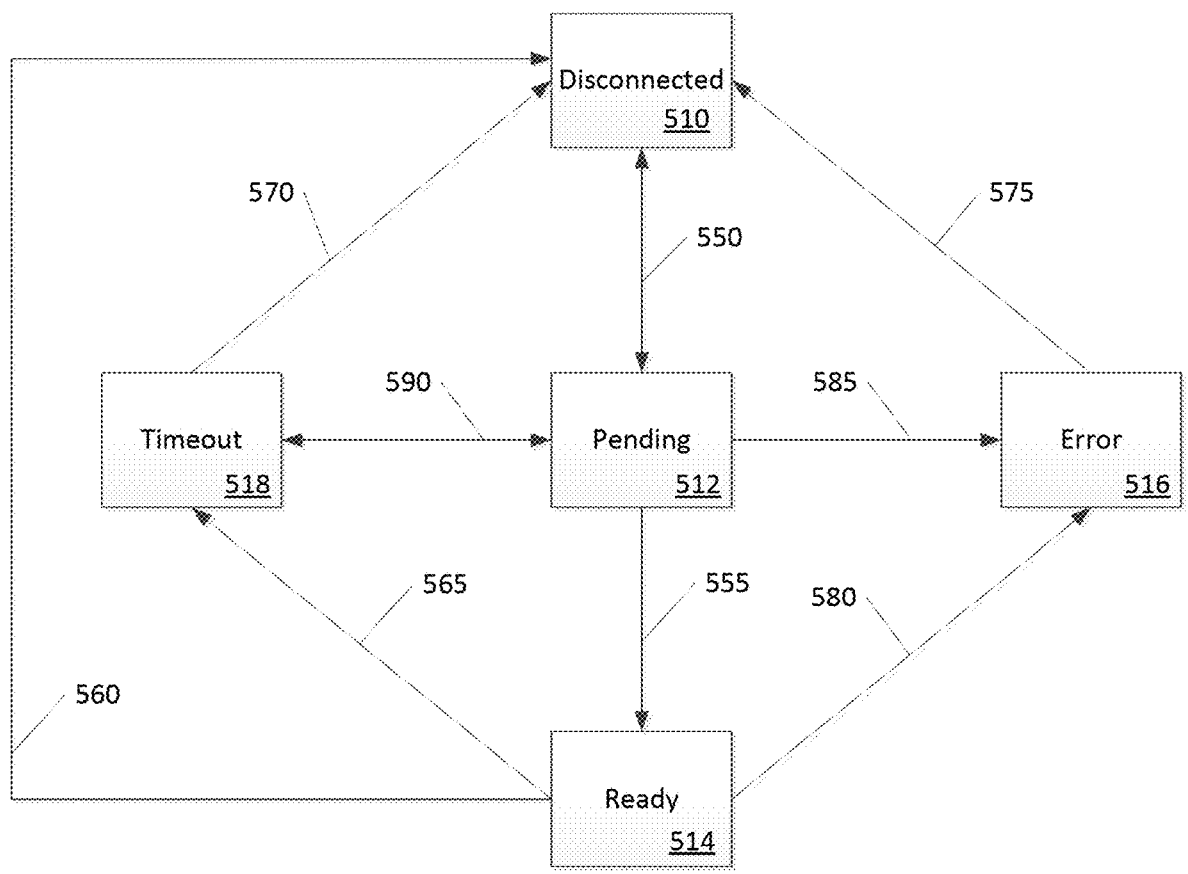
FIG. 5 is a state diagram illustrating the process for bringing up and down frontside stacking ports consistent with embodiments of the present disclosure.

FIG. 5 is a state diagram illustrating the process for bringing up and down frontside stacking ports consistent with embodiments of the present disclosure. Using a management protocol, each of the frontside stack ports may reside in one of a plurality of states: disconnected 510; pending 512, error 516; ready 514; or timeout 518. The initial state of a frontside stacking port is in the disconnected state 510. A link down event 560, 570, 575, or 550 may return the state of the frontside stacking port to the disconnected state 510. After a link up notification is received 510, the frontside stacking port transitions to a pending state 512. Upon entering the pending state 512, the frontside stacking port starts sending hello messages with switch specific information to its peer. After satisfying eligibility criteria 555, the port moves to the ready state 514 and adds itself to a stack port bundle. This may also trigger a message to the stack manager that the frontside stacking port is UP, and it may now begin a frontside stacking topology discovery process.

In the following scenarios the frontside stacking port moves to an error state 516 via 580 and 585: if peer information does not match previously stored information from the same peer; or a stack/domain id of the neighbor switch does not match.

In the ready state 514, the frontside stacking port manager will keep sending keep alive messages to make sure that the port can be used to send and receive stack traffic. The frontside stacking port will transition to a disconnected state 530 if the port link goes down (560). The frontside stacking port will transition to a timeout state 518 when the port stops receives hello messages from its neighbor (565). And, as previously described, the state will transition from ready 514 to error 516 when the hello message from its peer has different system information than that earlier received from the same neighbor (580).

A frontside stacking port transitions to its timeout state 518 when, after a set number of seconds, for example five seconds, it stops receiving hello messages from its neighbor. The port remains in the timeout state 518 until: it receives a valid hello message that triggers the port to transition to its pending state 512 (590); or the link goes down forcing the port to move to the disconnected state 510 (570).

Any process, descriptions or blocks in flow charts or flow diagrams should be understood as representing modules, segments, or portions of code which include one or more executable instructions for implementing specific logical functions or steps in the process, and alternate implementations are included within the scope of the present disclosure in which functions may be executed out of order from that shown or discussed, including substantially concurrently or in reverse order, depending on the functionality involved. In some embodiments, steps of processes identified in FIGS. 3, 4, and 5 using separate boxes can be combined. Further, the various steps in the flow diagrams illustrated in conjunction with the present disclosure are not limited to the architectures described above in association with the description for the flow diagram (as implemented in or by a particular module or logic) nor are the steps limited to the example embodiments described in the specification and associated with the figures of the present disclosure. In some embodiments, one or more steps may be added to the methods described in FIGS. 3, 4, and 5 either in the beginning, end, and/or as intervening steps, and that in some embodiments, fewer steps may be implemented.

It should be emphasized that the above-described embodiments of the present disclosure are merely possible examples of implementations, merely set forth for a clear understanding of the principles of the switching systems and methods. Many variations and modifications may be made to the above-described embodiment(s) without departing substantially from the spirit and principles of the disclosure. Although all such modifications and variations are intended to be included herein within the scope of this disclosure and protected by the following claims, the following claims are not necessarily limited to the particular embodiments set out in the description.

We claim:

1. A method comprising:
   discovering capabilities of a second switch connected to the first switch, where the capabilities include frontside stacking;
   changing a port on the first switch connected to the second switch from a standard port to a frontside stacking port;
   discovering a topology of a network containing the first switch and the second switch; and
   creating a drop table having entries for at least the first switch and the second switch, wherein the drop table comprises a first column comprising a list of a plurality of origin switches for a packet and at least one second column comprising a corresponding action for the packet at a current destination switch for a corresponding origin switch of the plurality of origin switches, and wherein the corresponding action comprises at least one of the following: a command to drop the packet and a command to forward the packet.

2. The method of claim 1, further comprising populating the drop table with the command to drop the packet and the command to forward the packet received by the port on the first switch.

3. The method of claim 2, wherein the drop table is populated manually.

4. The method of claim 2, wherein the drop table is populated automatically.

5. The method of claim 4, wherein the drop table is populated automatically using a spanning tree-like function.

6. A system of switches arranges in a mesh topology, comprising:
   a first switch, a second switch, a third switch, and a fourth switch, wherein the first switch is connected to the second switch and the fourth switch, the second switch is further connected to the fourth switch and the third switch, and the third switch is further connected to the fourth switch, further wherein each connection is made using ports configured as frontside stacking ports; and
   a drop table configured to provide information about the relationship between each port on each switch and each other switch, wherein the drop table comprises a first column comprising a list of a plurality of origin switches for a packet and at least one second column comprising a corresponding action for the packet at a current destination switch for a corresponding origin switch of the plurality of origin switches, and wherein the corresponding action comprises at least one of the following: a command to drop the packet and a command to forward the packet.

7. The system of claim 6, wherein the drop table further comprises entries for each combination of an originating port and a current port/destination port.

8. The system of claim 6, wherein each switch is configured to drop or forward a received packet based on an appropriate entry in the drop table.

9. A method comprising:
   performing a drop table check on the packet, wherein the drop table comprises a first column comprising a list of a plurality of origin switches for the packet and at least one second column comprising a corresponding action for the packet at a current destination switch for a corresponding origin switch of the plurality of origin switches, and wherein the corresponding action comprises at least one of the following: a command to drop the packet and a command to forward the packet;
   performing a déjà vu check on the packet;
   performing a source node check on the packet; and
   when the packet passes each of the checks, forwarding the packet from a first switch of the plurality of switches to a second switch of the plurality of switches.

10. The method of claim 9, further comprising performing a control packet check on the packet and when the packet is a control packet forwarding the packet without performing any further check.

11. The method of claim 9, further comprising computing the shortest physical path from the first switch to the second switch.

12. The method of claim 9, further comprising computing the shortest logical path from the first switch to the second switch.

13. A method for managing a frontside stacking port, comprising:
   placing the frontside stacking port of a first switch of a plurality of switches in a disconnected state upon startup;

when a link up notification is received, placing the frontside stacking port in a pending state;

when eligibility criteria are met; transitioning the front side stacking port from the pending state to a ready state; and populating the first switch with a drop table, wherein the drop table comprises a first column comprising a list of a plurality of origin switches for a packet and at least one second column comprising a corresponding action for the packet at a current destination switch for a corresponding origin switch of the plurality of origin switches, and wherein the corresponding action comprises at least one of the following: a command to drop the packet and a command to forward the packet.

14. The method of claim 13, comprising when the frontside stacking port receives a link down event, transitioning the frontside stacking port to a disconnected state.

15. The method of claim 13, comprising when the frontside stacking port detects that peer information does not match a previously stored set of peer information, transitioning the frontside stacking port to an error condition.

16. The method of claim 13, comprising when the frontside stacking port detects that stack/domain id of a neighboring switch does not match, transitioning the frontside stacking port to an error condition.

17. The method of claim 13, comprising when the frontside stacking port stops receiving hello messages from its neighbor, transitioning the frontside stacking port to a timeout condition.

18. The method of claim 17, comprising when the frontside stacking port receives a valid hello message, transitioning the frontside stacking port to the disconnected state.

19. The method of claim 17, comprising when the link goes down, transitioning the frontside stacking port to the disconnected state.

* * * * *